US012633854B2

(12) United States Patent
Kalolia et al.

(10) Patent No.: US 12,633,854 B2
(45) Date of Patent: May 19, 2026

(54) DYNAMIC OFFSETS FOR USE IN MOTOR CONTROL

(71) Applicant: Rockwell Automation Technologies, Inc., Mayfield Heights, OH (US)

(72) Inventors: Maulik R. Kalolia, Twinsburg, OH (US); Aderiano M. da Silva, Oak Creek, WI (US); Robert J. Miklosovic, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 525 days.

(21) Appl. No.: 18/215,914

(22) Filed: Jun. 29, 2023

(65) Prior Publication Data

US 2025/0007435 A1 Jan. 2, 2025

(51) Int. Cl.
| | |
|---|---|
| *H02P 21/20* | (2016.01) |
| *H02P 21/22* | (2016.01) |
| *H02P 23/14* | (2006.01) |

(52) U.S. Cl.
CPC .............. *H02P 21/20* (2016.02); *H02P 21/22* (2016.02); *H02P 23/14* (2013.01)

(58) Field of Classification Search
CPC ...... H02P 23/14; H02P 21/13; H02P 21/0003; H02P 21/20; H02P 21/22

USPC ...................................................... 318/400.15
See application file for complete search history.

(56) References Cited

U.S. PATENT DOCUMENTS

| | | | | |
|---|---|---|---|---|
| 8,861,947 B2* | 10/2014 | Webb | ...................... | H04N 23/51 |
| | | | | 396/421 |
| 10,015,928 B2* | 7/2018 | Nykamp | .............. | A01D 43/073 |
| 2019/0146434 A1* | 5/2019 | Fast | ..................... | G05B 19/042 |
| | | | | 700/37 |
| 2023/0238905 A1* | 7/2023 | Hoffman | ................. | H02P 23/14 |

* cited by examiner

*Primary Examiner* — Jorge L Carrasquillo
(74) *Attorney, Agent, or Firm* — Boyle Fredrickson, S.C.

(57) ABSTRACT

A system and method for motor control includes at least one dynamic offset value provided to a motor drive. Each dynamic offset value is determined by an external processing device and transmitted to the motor drive. The external processing device includes a rigid-body model of the motor and of the load controlled by the motor to generate each dynamic offset value. The dynamic offset value may be a position, velocity, or torque offset signal or a combination thereof. Each dynamic offset value and the desired motion profile are provided at a first update rate. The system control loops execute at a second update rate faster than the first update rate. Each dynamic offset value and the reference command are interpolated to generate values for each period of the second update rate. The interpolated values are provided to the system control loops to achieve desired performance of the motor.

20 Claims, 9 Drawing Sheets

DYNAMIC OFFSETS FOR USE IN MOTOR CONTROL

BACKGROUND INFORMATION

The subject matter disclosed herein relates to dynamic offsets for improved control of a motor by a motor drive. More specifically, a dynamic offset value, received at an input to the motor drive at a coarse update rate is interpolated to a servo update rate and filtered for use during a servo update rate within the motor drive.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The rectifier section may be passive and include diodes or alternately, the rectifier section may be active and include power electronic switching devices, such as insulated gate bipolar transistors (IGBTs), metal-oxide semiconductor field-effect transistors (MOSFETs), thyristors, or silicon-controlled rectifiers (SCRs). The power electronic switching device typically includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus. The motor drive further includes an inverter section to convert the DC voltage on the DC bus to a desired AC voltage output to the motor. The inverter section includes power electronic switching devices as discussed above to selectively connect the DC bus to the output of the motor drive, thereby generating the desired AC voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the motor. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

In order to convert the command signal to the desired output voltage, the motor drive includes a control section. The control section may vary in complexity according to the performance requirements of the motor drive. For instance, a motor drive controlling operation of a pump may only need to start and stop the pump responsive to an on/off command. The motor drive may require minimal control such as an acceleration and deceleration time for the pump. In contrast, another motor drive may control a servo motor moving, for example, one axis of a machining center or an industrial robotic arm. The motor drive may need to not only start and stop the motor but also operate at various operating speeds and/or torques or follow a position command. The motor control for a servo motor may include multiple control loops, such as a position loop, velocity loop, acceleration loop, torque loop, current loop, or a combination thereof. Each control loop may include, for example, a proportional (P), integral (I), or derivative (D) controller and an associated controller gain value for each controller in the control loop.

Regardless of the complexity of the control loop required, the control section for motor control has historically been a single-input, single-output (SISO) system. In other words, a single command, such as position, velocity, or torque is provided as the input, and a single, controlled voltage or current is output from the motor drive. Within the control loop, the input may be fed through cascaded or paralleled control loops. For example, a position command is initially fed into a position regulator which outputs a velocity command. The velocity command is cascaded into a velocity regulator which, in turn, outputs an acceleration reference. The acceleration reference is proportional to a desired torque or desired current output from the motor drive and is provided to a further cascaded current regulator. It may also be desirable to utilize the position command as a feed forward value. Providing the position command to a derivative block, where the derivative block is arranged in parallel to the position regulator, generates a velocity feed forward value. The velocity feed forward value is summed with the velocity command prior to the velocity regulator. Similarly, the velocity feed forward value may be provided to another derivative block, where the additional derivative block is arranged in parallel to the velocity regulator, to generate an acceleration feed forward value. The acceleration feed forward value is summed with the acceleration reference before converting the acceleration reference to a current reference and supplying the current reference to the current regulator. Various applications may utilize only a portion of these elements; however, each control system still represents a SISO system. The selected SISO system must be configured to entirely compensate for the dynamics of the controlled system.

In order to achieve the desired operating performance of the motor, it is necessary to properly select the desired regulators, the associated controller gain values associated with each regulator, the desired feed forward elements, and gains associated with each feed forward element. Adjusting one gain value in a SISO system impacts performance of other gain values within the system. Further, feed forward values and feedback regulators separately attempt to compensate for the dynamics in a controlled system. Tuning the controller typically takes a very experienced technician and can often require a substantial amount of time. Further, the interaction of gains may limit the available performance from the motor drive.

Thus, it would be desirable to provide an improved system and method for motor control by a motor drive.

It would further be desirable to provide dynamic offset values in parallel with a SISO system to reduce following error observed in the SISO system.

BRIEF DESCRIPTION

According to one embodiment of the invention, a motor drive for controlling operation of a motor includes a DC bus having a positive rail and a negative rail and an inverter section having a plurality of switching elements. The DC bus is operable to receive a DC voltage between the positive rail and the negative rail, and each switching element is controlled by a gating signal. The inverter section is operable to receive the DC voltage from the DC bus and provide an AC voltage at an output of the motor drive. The motor drive also includes an input interface, a feedback interface, and a controller. The input interface is configured to receive a reference signal and an offset signal from an external source, and the reference signal and the offset signal are sampled from the input interface at a first update rate. The feedback interface is configured to receive a position feedback signal from a position sensor operatively connected to the motor. The controller is operable to sample the feedback interface to obtain values of the position feedback signal at a second update rate and to interpolate the reference signal, sampled at the first update rate, to generate a plurality of values of the reference signal at the second update rate, where the second update rate is faster than the first update rate. The controller is further operable to interpolate the offset signal, sampled at the first update rate, to generate a plurality of values of the offset signal at the second update rate and to generate either a voltage reference or a current reference as a function of the position feedback signal, the reference signal, and the offset signal at the second update rate. The voltage reference or the current reference corresponds to desired operation of the motor connected to the motor drive.

According to another embodiment of the invention, a method for controlling operation of a motor includes obtaining a reference signal and an offset signal from an input interface of a motor drive at a first update rate and sampling a position feedback signal at a second update rate. The motor drive is operatively connected to control operation of the motor, and the position feedback signal corresponds to an angular position of the motor. The second update rate is faster than the first update rate. The reference signal is interpolated to generate a plurality of values of the reference signal at the second update rate, and the offset signal is interpolated to generate a plurality of values of the offset signal at the second update rate. Either a voltage reference or a current reference is generated as a function of the position feedback signal, the reference signal, and the offset signal at the second update rate, where the voltage reference or the current reference corresponds to desired operation of the motor connected to the motor drive.

According to still another embodiment of the invention a controller for a motor includes an input interface configured to receive a reference signal and an offset signal from an external source, a feedback interface configured to receive a position feedback signal corresponding to an angular position of the motor, and a processor. The processor is operative to sample the reference signal and the offset signal at a first update rate and sample the position feedback signal at a second update rate, where the second update rate faster than the first update rate. The processor interpolates the reference signal, sampled at the first update rate, to generate a plurality of values of the reference signal at the second update rate and interpolates the offset signal, sampled at the first update rate, to generate a plurality of values of the offset signal at the second update rate. The processor is further operative to generate either a voltage reference or a current reference as a function of the position feedback signal, the reference signal, and the offset signal at the second update rate, where the voltage reference or the current reference corresponds to desired operation of the motor.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
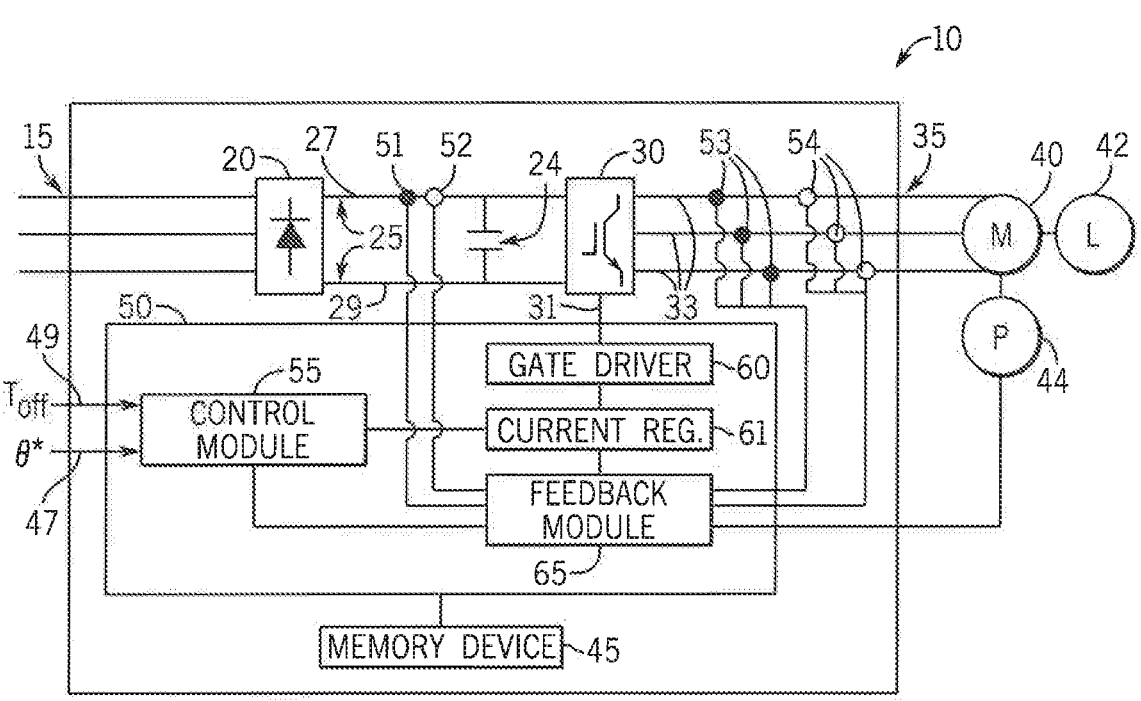
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for motor control in a motor drive. At least one dynamic offset value is provided as an input to the motor drive. Each dynamic offset value works in combination with a reference command to the system control loops to achieve desired operation and reduce following error of a motor connected to the motor drive. Each dynamic offset value is determined by an external processing device. The external processing device includes, for example, a model of the motor and of the load controlled by the motor. The model includes rigid-body dynamics for the motor and the controlled load. The rigid-body dynamic model uses a desired motion profile for the motor to generate each dynamic offset value. The dynamic offset value may be a position offset signal, a velocity offset signal, a torque offset signal, or a combination thereof. According to one aspect of the invention, the external processing device may generate both the desired motion profile and each dynamic offset value. Optionally, the external processing device may receive the desired motion profile and generate each dynamic offset value. The position offset value corresponds to a desired position of the motor defined by the motion profile. The velocity offset value corresponds to a desired velocity of the motor to achieve the desired position of the motor. The torque offset value defines the torque required from the motor to achieve the desired position of the motor as a function of the rigid-body model defined in the external processing device.

Each dynamic offset value and the desired motion profile may be provided to the motor drive at a first update rate. The dynamic offset value may be the position, velocity, and/or torque offset values as provided to the motor drive, and the desired motion profile is provided as a position reference command to the motor drive. The system control loops are configured to execute at a second update rate, where the second update rate is faster than the first update rate. Each dynamic offset value and the reference command are interpolated such that new values for each dynamic offset value and for the reference command are generated for each period of the second update rate. The interpolated values are provided to the system control loops to achieve desired performance at the second update rate.

Figure 2:
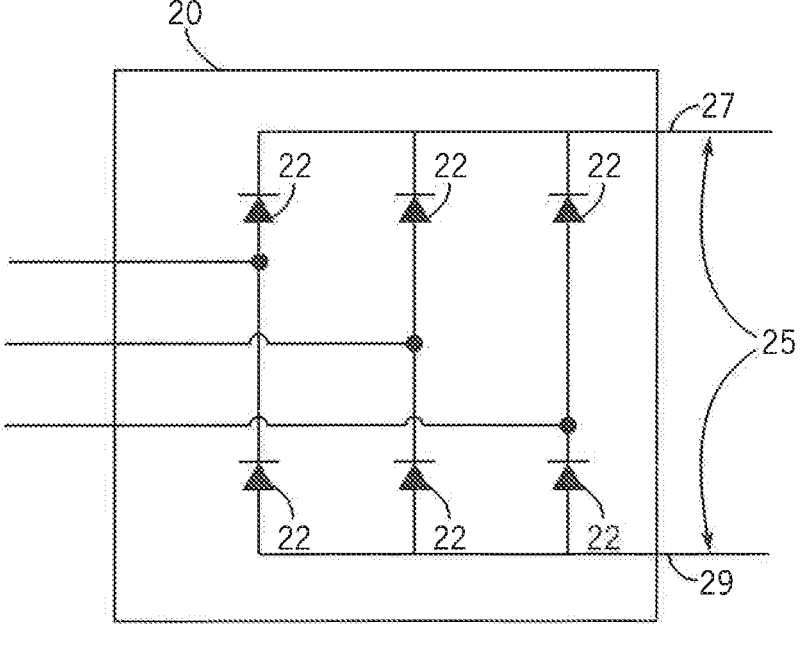
FIG. 2 is a block diagram representation of a rectifier section from the motor drive of FIG. 1.

Turning initially to FIG. 1, a motor drive 10, according to one embodiment of the invention, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. With reference also to FIG. 2, the illustrated rectifier section 20 includes a set of diodes 22 forming a diode bridge that rectifies the three-phase AC voltage to a DC voltage on the DC bus 25. Optionally, the rectifier section 20 may include other solid-state devices including, but not limited to, insulated gate bipolar transistors (IGBTs), metal-oxide semiconductor field-effect transistors (MOSFETs), thyristors, or silicon-controlled rectifiers (SCRs) to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 3:
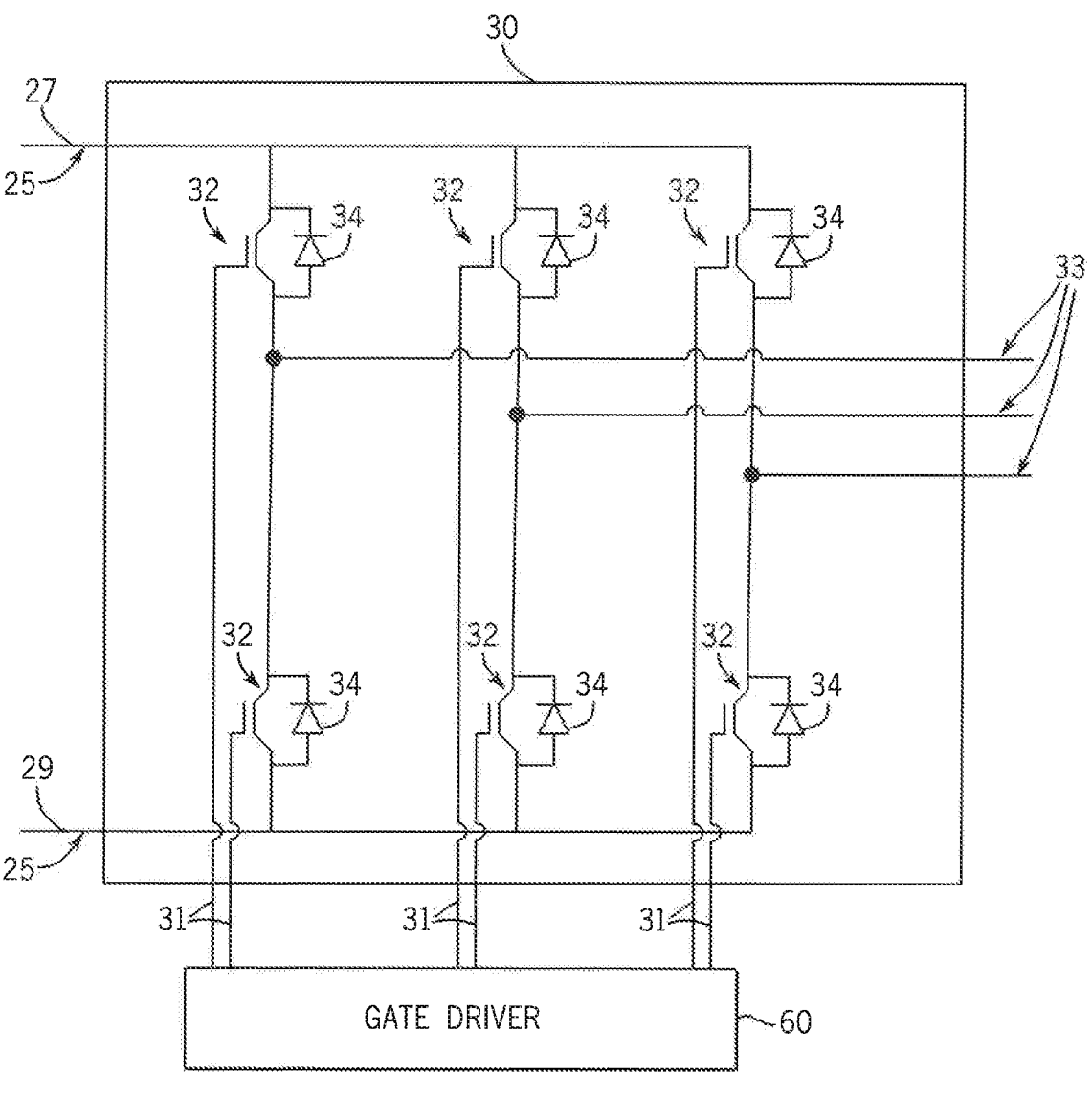
FIG. 3 is a block diagram representation of an inverter section and gate driver module from the motor drive of FIG. 1.

The DC bus 25 is connected in series between the rectifier section 20 and an inverter section 30. Referring also to FIG. 3, the inverter section 30 consists of switching elements, such as IGBTs, MOSFETs, thyristors, or SCRs as is known in the art. The illustrated inverter section 30 includes an IGBT 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

The controller 50 receives a command signal 47 from an external source identifying desired operation of the motor 40 connected to the motor drive 10. The command signal 47 may be, for example, a position command ($\theta^*$), a speed command ($\omega^*$), or a torque command ($T^*$). For a high performance servo control system, the command signal 47 is commonly a position command signal ($\theta^*$). For purposes of discussion herein, the command signal 47 will be the position command signal ($\theta^*$) as shown in FIG. 1. In addition to the command signal 47, the controller 50 receives at least one offset signal from an external source. According to the embodiment shown in FIG. 1, a single offset signal 49 is provided. The single offset signal is utilized for ease of illustration and discussion and is not intended to be limiting. As will be discussed herein, multiple offset signals may be provided. According to the embodiment illustrated in FIG. 1, the offset signal 49 is a torque offset value, $T_{off}$. As will be discussed in more detail below, the torque offset value, $T_{off}$, 49 is a dynamic value and may be determined by an external source, or external processing device, having a rigid-body model of the motor 40 and load 42 to be controlled by the motor drive 10.

The motor drive 10 receives the command signal 47 and the dynamic offset signal 49 at an input interface. The input interface may be configured to receive an analog signal having a range between zero and a positive voltage, a range between a maximum negative value and a maximum positive value, or any other suitable range according to application requirements. Optionally, the input interface is a communication interface configured to receive data packets according to a communication protocol. The communication protocol may be, for example, a standard Ethernet communication protocol or an industrial protocol such as the Common Industrial Protocol (CIP) executing on Ethernet/IP™, DeviceNet™, or ControlNet™, or any other suitable communication protocol. The input interface may further include analog-to-digital converters, communication buffers, memory, or other electronic devices as would be understood in the art to sample a signal and convert a data signal from one form to a digital value suitable for use in a processing device.

Figure 4:
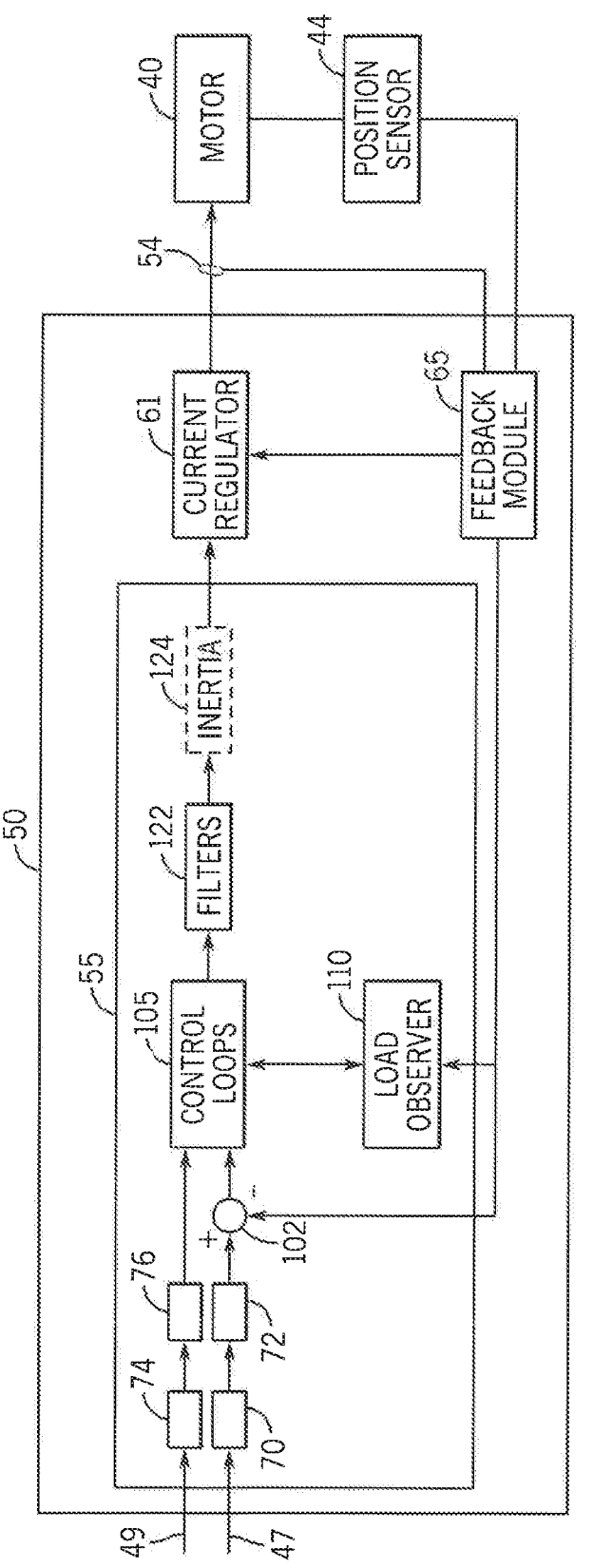
FIG. 4 is a block diagram representation of one embodiment of a controller from the motor drive of FIG. 1.

With reference also to FIG. 4, the command signal 47 and the offset signal 49 are sampled by the controller 50 at a first update rate. This first update rate is a slower update period within the motor drive 10. The first update rate may execute in the millisecond to tens of millisecond range. According to one aspect of the invention, the first update rate executes at a five millisecond interval. In order to achieve position regulation within desired tolerances for servo control, the control loops 105 execute at a second update rate, where the second update rate is faster than the first update rate. The second update rate may be configurable within the motor drive 10 and may execute in a range between twenty and two hundred microseconds and, for example at one hundred microseconds. A first interpolator 70 is provided in the control module 55 to receive the command signal 47. The first interpolator 70 generates a plurality of values for the command signal 47 corresponding to the second update rate. The output of the first interpolator 70 is provided as an input to a first notch filter 72. The first notch filter 72 is used to reduce or eliminate components of the command signal 47 that may generate undesirable performance of the motor 40 and/or load 42. Such components may include, for example, a frequency of operation that excites a resonance in the controlled system which, in turn, may generate vibration or unstable operation of the motor 40. The interpolated and filtered command signal is then provided to the summing junction 102 for comparison to the position feedback signal from the position sensor 44. A second interpolator 74 is provided in the control module 55 to receive the offset signal 49. The second interpolator 74 generates a plurality of values for the offset signal 49 corresponding to the second update rate. The output of the second interpolator 74 is provided as an input to a second notch filter 76. The second notch filter 76 is used to reduce or eliminate components of the offset signal 49 that may generate undesirable performance of the motor 40 and/or load 42. The interpolated and filtered offset signal is then provided as an input to the control loops 105 and will be used as a torque feed forward command, as discussed in more detail below.

Figure 5:
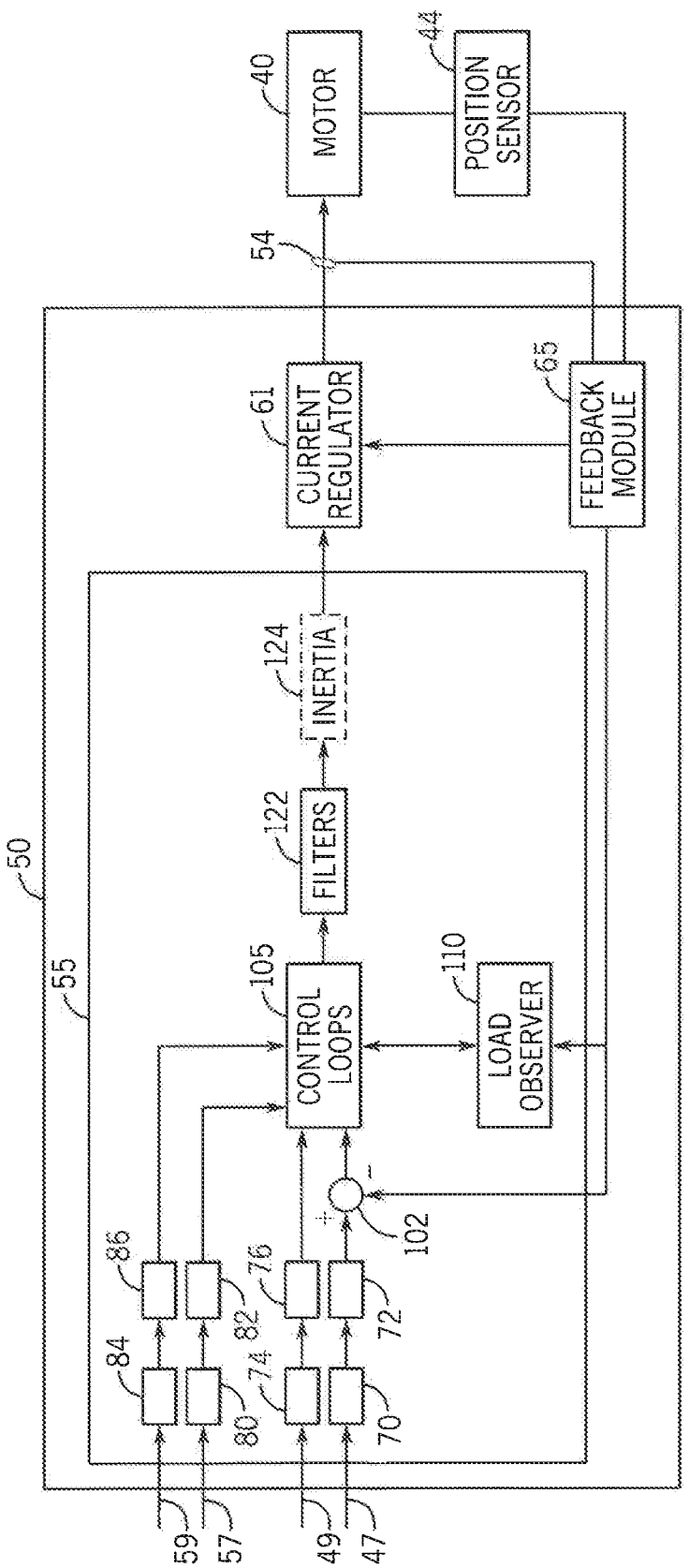
FIG. 5 is a block diagram representation of another embodiment of a controller from the motor drive of FIG. 1.

With reference also to FIG. 5, additional dynamic offset signals may be provided to the motor drive 10. The torque offset value, $T_{off}$, 49 is provided as a first dynamic offset signal. An additional position offset value, $\theta_{off}$, 57 and a velocity offset value, $\omega_{off}$, 59 are also provided to the motor drive. Each of the additional dynamic offset signals are similarly interpolated and filtered. The position offset value, $\theta_{off}$, 57 is provided to a third interpolator 80 and then to a third notch filter 82. The velocity offset value, off, 59 is provided to a fourth interpolator 84 and a fourth notch filter 86. Interpolating the dynamic offset signals 49, 57, 59 allows the signals to be provided to the control loops 105 for improvement of the performance of the motor 40 connected to the motor drive. Further, providing interpolation within the motor drive 10 reduces computational burden on both the external processing device and the communication network between the external processing device and the motor drive 10. The external processing device needs only to determine and transmit the dynamic offset signals at the first update rate rather than at the faster second update rate.

Figure 10:
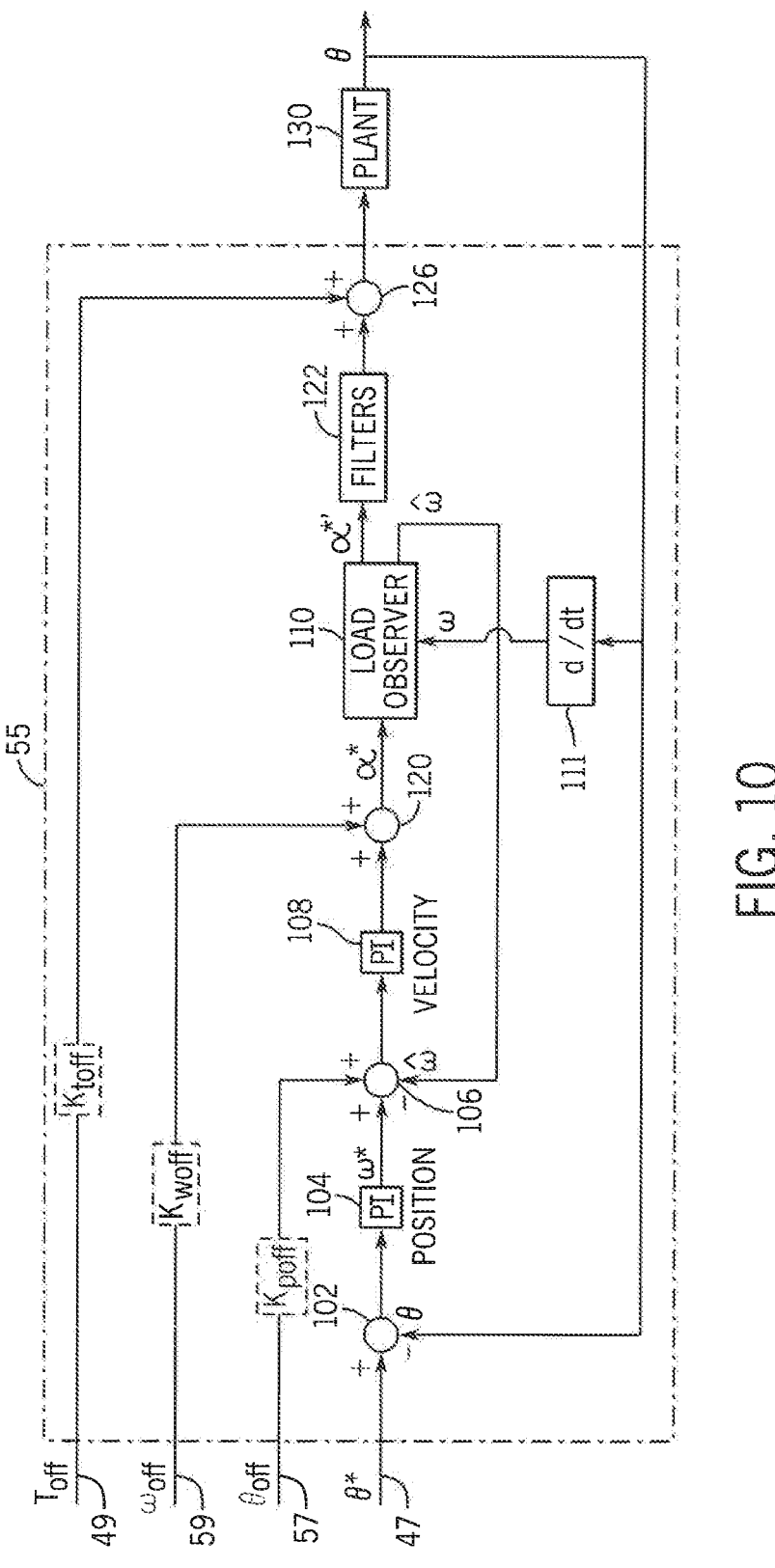
FIG. 10 is a block diagram representation of one embodiment of the control module for the controller of FIG. 5.

In some applications, the position reference signal 47 and the position offset value 57 may be identical. The signal may be provided to either input of the motor drive. If, for example, the external processing device receives a motion profile and generates offset signals, including the position offset value 57, desired control of the motor 40 may be achieved by providing only the dynamic offset values, including the position offset value 57 to the controller 50 and keeping the position reference signal 47 at zero. With reference also to FIG. 10, the dynamic position offset value 57 will act as a position command to the control loops 105 and the position regulator will compensate for disturbances in the controlled system that deviate from the dynamic position offset value 57.

With reference again to FIG. 4, the controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. A position feedback device 44 may be connected to the motor 40 and operable to generate a position feedback signal (θ) corresponding to the angular position of the motor 40.

The controller 50 utilizes the feedback signals and the command signal 47 to control operation of the inverter section 30 to generate an output voltage having a desired magnitude and frequency for the motor 40. The feedback signals are processed by the feedback module 65 and converted, as necessary, to signals for the control module 55. The control module 55 includes control loops 105 to receive an error signal, determined as a difference between the command signal 47 and a feedback signal. The control loops 105 execute responsive to the command signal 47 and the feedback signals to generate a desired reference signal. The control module 55 also includes a load observer 110 to generate one or more estimated values of an operating characteristic of the motor 40 or of a load connected to the motor. The estimated value may be an estimated position of the motor 40, an estimated velocity of the motor, an estimated acceleration present in the motor, or an estimated torque experienced at the motor. As will be discussed in more detail below, the estimated value may be used by a control loop or added to the reference signal output from one of the control loops to generate the desired reference signal. One or more filters 122 or gains may be included between the control loops 105 and the current regulator 61 according to an applications requirement. An inertia block 124 is illustrated as optional. The inertia of the motor, load, or a combined system inertia may be included as a separate gain or incorporated into controller gains within the control loops 105.

The output of the control module 55 is a current reference signal provided to the current regulator 61. As is understood in the art, the current regulator 61 may independently regulate a torque producing component of the current and a flux producing component of the current. The current reference signal may include both a torque reference component and a flux reference component. Optionally, the flux reference component may be a fixed value and the current reference signal may consist just of a torque reference component. The current regulator 61 uses the torque reference component and a current feedback signal to output a voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40. As is understood in the art, the current regulator 61 is configured to execute at a bandwidth sufficiently greater than the bandwidth of the control module 55 such that the current regulator 61 may be approximated as a unity gain to the control module 55.

Figure 6:
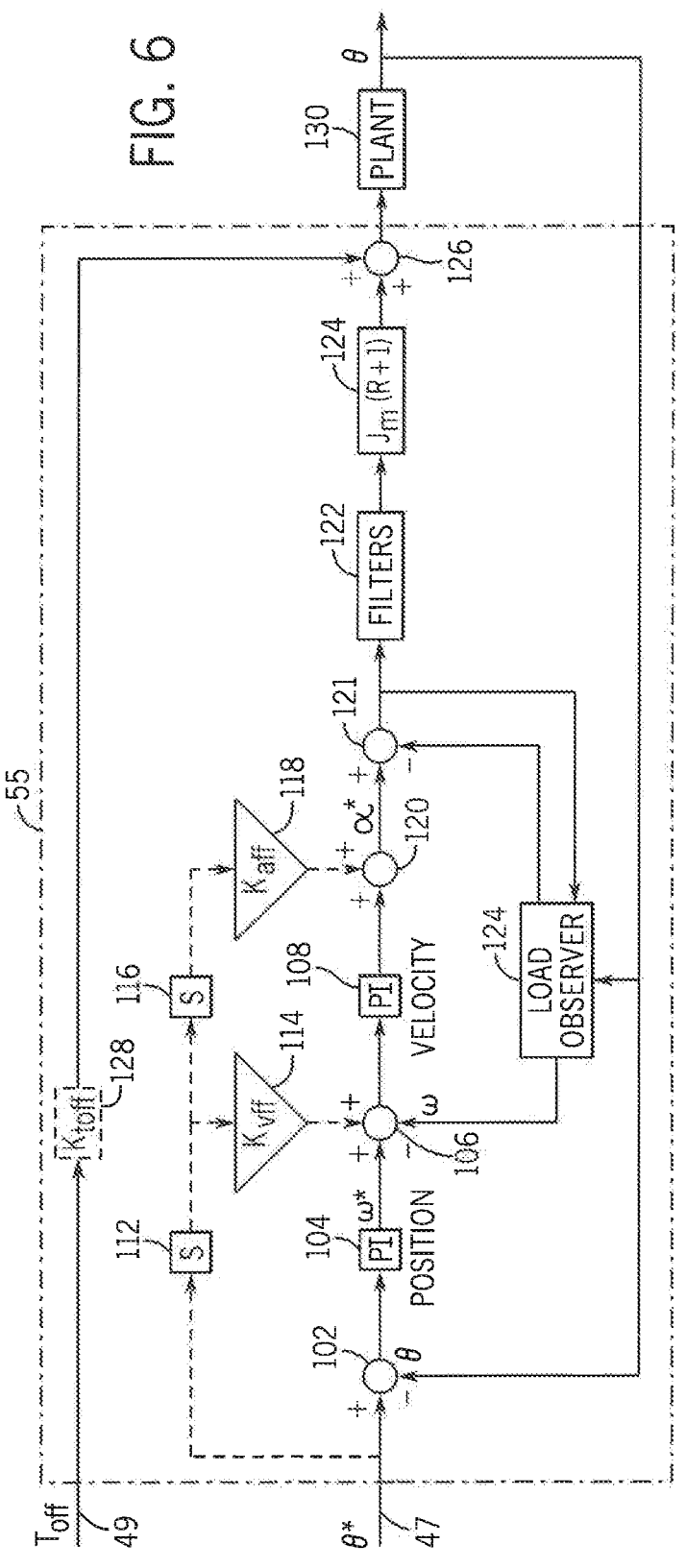
FIG. 6 is a block diagram representation of one embodiment of a control module for the controller of FIG. 4.

Referring next to FIG. 6, a control module 55 according to one embodiment of the invention is illustrated. The control module 55 receives a position command signal (θ*) 47 as an input. The position command signal (θ*) is compared to a position feedback signal (θ) at a first summing junction 102. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (1), and/or derivative (D) controllers of the position loop controller 104 includes a controller gain value. The controller gain values are commonly referred to as a proportional gain (Kpp), integral gain (Kpi), and a derivative gain (Kpd). The output of the position loop controller 104 is a velocity reference signal (ω*).

The velocity reference signal (ω*) is compared to a velocity feedback signal (ω) at a second summing junction 106. The velocity feedback signal (a) is generated by a load observer 110. A velocity error signal is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an acceleration reference signal.

The control module 55 may also include a first set of feed forward branches, generated from the position command signal (θ*) 47. According to the illustrated embodiment, the control module 55 includes feed forward branches generated from the position command signal (θ*) 47 for both the velocity and the acceleration elements. The position command signal (θ*) is passed through an initial derivative element 112 to obtain a velocity feed forward signal. The velocity feed forward signal is multiplied by a velocity feed forward gain (Kvff) 114 and combined with the velocity reference signal (ω*) and the velocity feedback signal (co) at the second summing junction 106. The velocity feed forward signal is passed through another derivative element 116 to obtain an acceleration feed forward signal. The acceleration feed forward signal is multiplied by an acceleration feed forward gain (Kaff) 118 and combined with the acceleration reference signal at a third summing junction 120. The output of the third summing junction 120 is an acceleration reference, α*, and in the embodiment of the control module 55 illustrated in FIG. 6, the acceleration reference signal is the reference signal generated by the control loops 105.

The first set of feed forward branches, generated from the position command signal (θ*) 47, are illustrated as optional. The control module 55 also receives the offset signal 49 as a torque offset value, $T_{off}$. This torque offset value, $T_{off}$, may be generated by an external computing device, such as a programmable logic controller (PLC), programmable automation controller (PAC), a dedicated motion processing device, or other computing device. The external computing device includes a model for the rigid-body dynamics of the motor 40 and load 42. The rigid-body dynamics of the motor 40 and load 42 predict a portion of the expected operating characteristics of the controlled system. The rigid-body dynamics are typically less computationally intense than the elastic dynamics and provide an initial estimate of the operating performance of the controlled system. The external computing device receives and/or determines the position command signal (θ*) 47 and uses the rigid-body dynamic model to determine the expected torque required by the motor 40 to follow the desired position command. By determining the expected torque required by the motor 40 to follow the desired position command, this expected torque may be supplied as a dynamic offset value 49 to the motor drive and used as a feed forward signal to achieve at least a portion of the desired performance of the controlled system. If the controlled system is accurately modeled just from the rigid-body model, the dynamic offset value 49 would be sufficient to obtain desired operation of the motor 40. The torque offset value provided at the dynamic offset value 49 may substitute for the feed forward paths generated from the position command signal. The feed forward gains 114, 118 for the velocity and acceleration feed forward paths may be set to zero to disable these feed forward paths. Because the actual controlled system will typically include some elastic, or compliant, performance based, for example, on couplings between a motor shaft and a driven shaft the control loops 105 and the load observer 110 within the control module 55 compensate for the elastic dynamic elements not included in the rigid-body model used by the external computing device.

The offset signal 49 is illustrated being provided to an offset gain 128. The offset gain 128, illustrated as a torque offset gain ($K_{toff}$), is shown as optional. The external computing device may include a selectable gain, which may render a separate gain within the control module 55 unnecessary. Optionally, the control module 55 may simply use the offset signal 49 provided by the external processing device directly as a feed forward signal and allow the other control loops 105 to compensate for any error in the dynamic offset signal. In some applications, it may be desirable to adjust the torque offset gain ($K_{toff}$) 128 and, therefore, it is illustrated as an optional gain value within the torque offset path. The dynamic offset signal 49 is provided to a summing junction 126 subsequent to the feedback control paths such that the feedback control loops 105 may be tuned independently of the torque offset provided from the external processing device.

Figure 7:
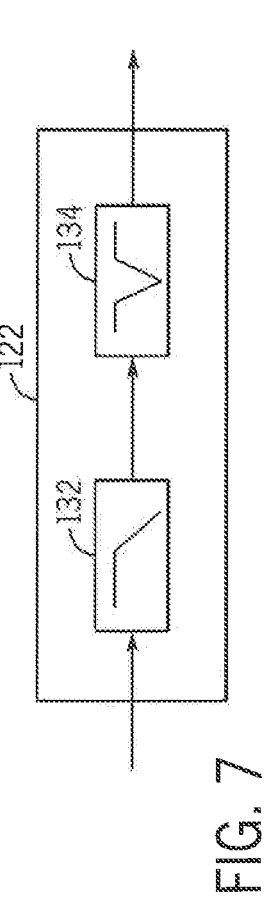
FIG. 7 is a block diagram representation of the filter section from the control module of FIG. 6.

Returning again to the output of the third summing junction 120 illustrated in FIG. 6, the acceleration reference, α*, is combined with an estimated acceleration, â, applied to the motor shaft as a result of the load torque at a fourth summing junction 121. The estimated acceleration, â, is the estimated response determined by the load observer 110. With the rigid-body dynamics included in the torque offset signal 49, the load observer 110 primarily compensates for the elastic dynamics within the controlled system. The estimated acceleration, â, is the estimated response to the dynamic elements of the controlled system not included in the torque offset signal 49. The output of the fourth summing junction 121 is the modified reference signal and is provided as an input to a filter section 122. The filter section 122 may include one or more filters to remove unwanted components from the control system. Referring also to FIG. 7, the illustrated filter section 122 includes a low pass filter 132 to attenuate undesirable high frequency components and a notch filter 134 to attenuate specific frequency components having an undesirable effect on the controlled mechanical load 42. It is further contemplated that additional filters may be included in the filter section 122 without deviating from the scope of the invention.

According to the embodiment illustrated in FIG. 6, the output of the filter section 122 is provided to an inertia scaling block 124, and the inertia scaling block 124 applies a gain corresponding to the inertia of the controlled system. The gain of the inertia scaling block 124 includes a motor inertia value, Jm, and a ratio, R, of the load inertia, Jl, to the motor inertia, Jm. As indicated above, the output of the control module 55 is provided to a current regulator 61 and gate module 60 to output a desired voltage to the motor 40. The plant 130 shown in FIG. 6 represents components of the motor 40 and motor drive 10 external to the control module 55 and may incorporate the current regulator 61, gate module 60, and the inverter section 30 of the motor drive 10, the motor 40, a mechanical load 42, and a position feedback device 44. The position feedback device 44 generates the position feedback signal (θ) used by the control module 55. Although the reference signal from the control loops 105 is illustrated as an acceleration reference, α*, in FIG. 6, the output of the third summing junction 120 may be an acceleration or torque reference signal.

Figure 8:
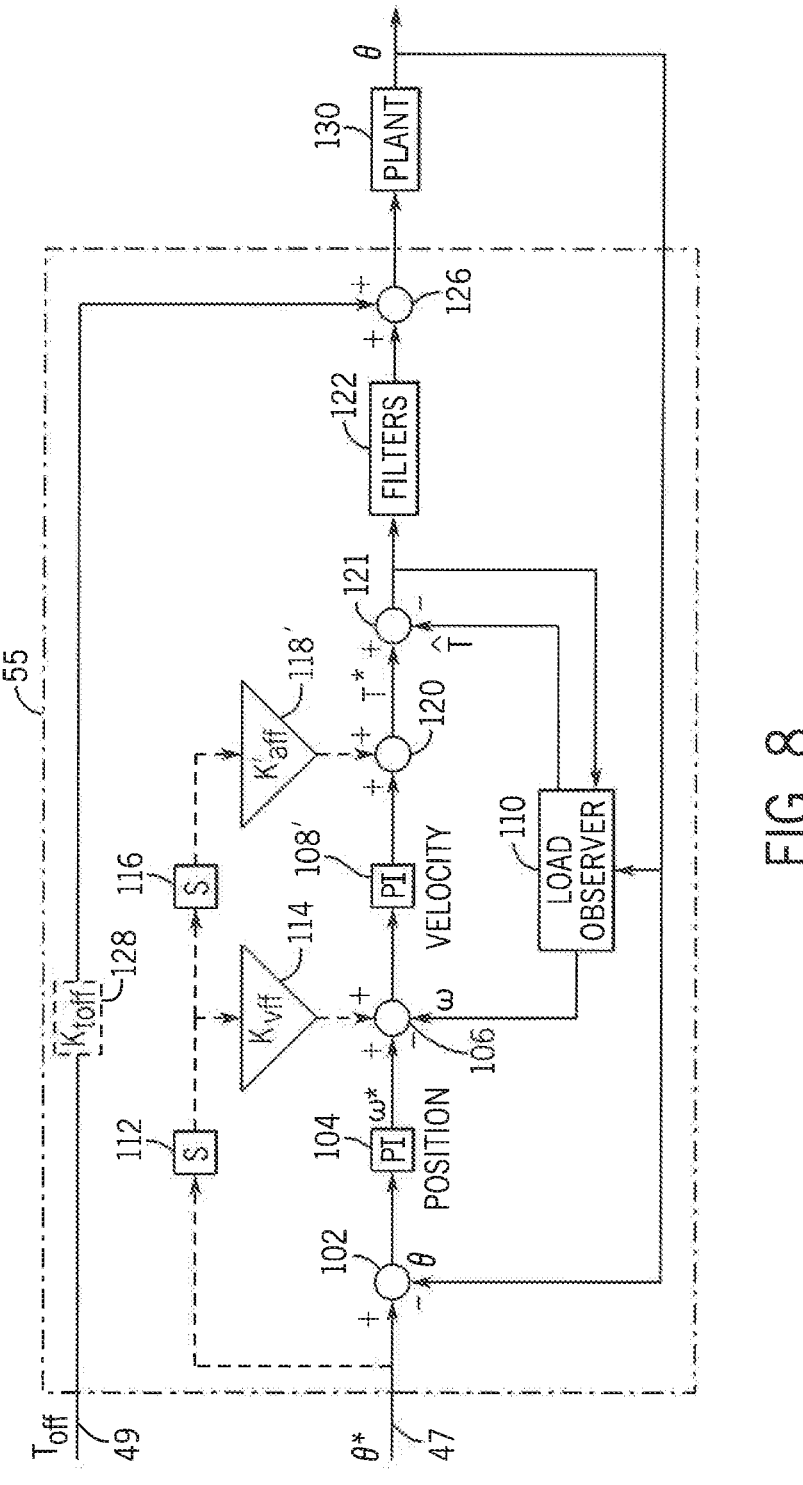
FIG. 8 is a block diagram representation of another embodiment of the control module for the controller of FIG. 4.

With reference to FIG. 8, the inertial gains from the inertia block 124 may be incorporated into the controller gains. FIG. 8 illustrates a modified acceleration feed forward gain (K'aff) 118' and a modified velocity loop controller 108' indicating that the inertial gains have been incorporated within the controller gains. As is understood in the art, angular acceleration is proportional to torque and, more specifically, torque is equal to inertia times the angular acceleration. As a result, the reference signal generated by the control loops 105 is a torque reference, T*, and the estimated response generated by the load observer 110 is an estimated torque, T̂, applied to the motor shaft as a result of the dynamics not compensated within the torque offset signal 49 and present as a load on the motor 40. The torque reference, T*, and the estimated torque, T̂, are combined at the fourth summing junction 121 to provide the modified reference signal, which in this embodiment is a modified torque reference signal, as an input to the filter 122. Because the inertial gains have been incorporated with the controller gains, the inertia block 124 shown in FIG. 6 is not required in the exemplary control module 55 illustrated in FIG. 8. The output of the filters 122 is a torque reference that may be summed with the torque offset signal 49 and provided to the current regulator 61.

According to still another embodiment of the invention, it is contemplated that the calculations for the control module 55 may be performed in a per unit system. A per unit system employs scaling factors to convert values in physical units to values in a percentage, or per unit value, where the expected operational range for the value is converter to a value between zero and one or between zero and one hundred percent. Depending on the per unit system, a range of zero to one hundred percent acceleration may be equivalent to a range of zero to one hundred percent torque. As a result, a per unit value of acceleration would be equivalent to a per unit value of torque. Each of the reference signal, modified reference signal, and the filtered reference signal in the per unit system would be a unitless reference signal.

In still other embodiments, the inertia of the motor may be included in a filter gain to convert the acceleration reference signal output from the third summing junction 120 to a torque reference signal in the filter section 122. Combining the inertial gain with another controller gain or with the filter gain reduces the real time computational burden imposed on the controller 50 of the motor drive 10.

Figure 9:
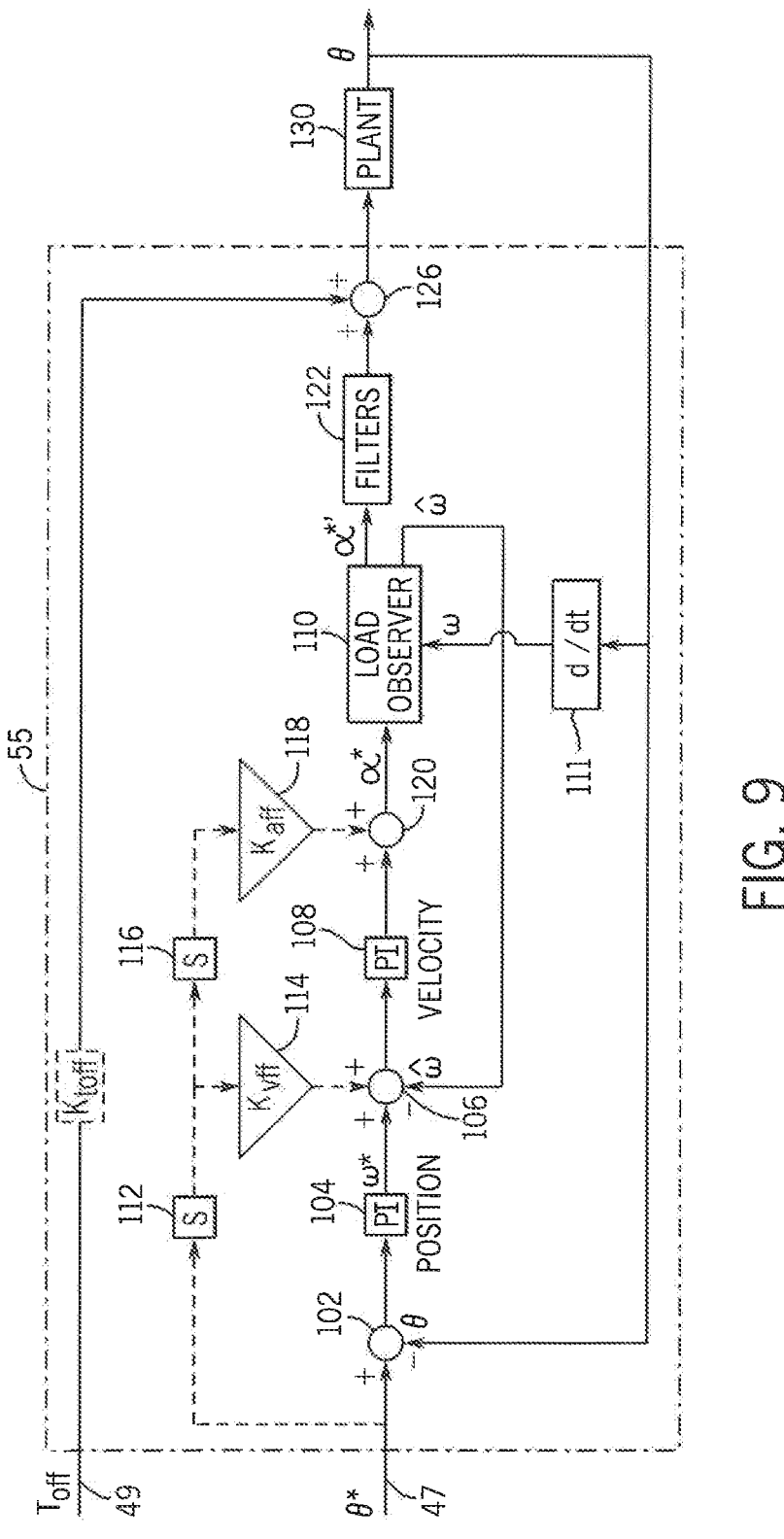
FIG. 9 is a block diagram representation of still another embodiment of the control module for the controller of FIG. 4.

Turning next to FIG. 9, still another embodiment of the control module 55 is illustrated. The load observer 110 is provided as a cascaded control element after the third summing junction 120. The load observer receives the acceleration reference, α*, as an input along with a speed feedback signal, ω. The speed feedback signal, ω, is determined by passing the position feedback signal, θ, through a derivative block 111. An estimated angular velocity, ω̂, is output from the load observer 110 and provided as the speed feedback signal to the second summing junction 106. The load observer uses the speed feedback signal and the acceleration reference to determine the uncompensated dynamics of the controlled system and generate a modified acceleration reference signal, α*'. The modified acceleration reference signal, α*', is provided to the filter block 122. The inertia is accounted for by either adding an inertia block (not shown) in series with the acceleration reference signal, α*, or by incorporating the inertia into a gain value within the load observer 110 or within a filter 122. The output of the filter block 122 is a torque reference signal, T*, that is added to the torque offset signal, $T_{off}$, at the fourth summing junction 126.

Turning next to FIG. 10, yet another embodiment of the control module 55 is illustrated. As indicated above, the dynamic offset signals may include multiple dynamic offset signals. FIG. 10 illustrates a control module 55 receiving the position offset signal, $\theta_{off}$, 57; the velocity offset signal, $\omega_{off}$, 59; and the torque offset signal, $T_{off}$. As further indicated above, the feed forward paths derived from the position reference signal, θ*, 47 are optional. For the control module 55 illustrated in FIG. 10, these feed forward paths are removed. They may be removed entirely or, alternately, the feed forward gains 114, 118 may be set to zero to effectively remove the feed forward paths. In the embodiment shown in FIG. 10, the dynamic offset values 49, 57, and 59 provide command elements to the controller 55. Each dynamic offset signal includes an offset gain. The position offset signal, $\theta_{off}$, 57 includes a position offset gain, $K_{poff}$; the velocity offset signal, $\omega_{off}$, 59 includes a velocity offset gain, $K_{\omega off}$; and the torque offset signal, $T_{off}$, includes the torque offset gain, $K_{toff}$. Each offset gain is shown as optional. The external computing device may include a selectable gain for each dynamic offset signal 49, 57, and 59, which may render a separate gain within the control module 55 unnecessary. Optionally, the control module 55 may simply use each dynamic offset signal 49, 57, and 59 provided by the external processing device directly as a command signal and allow the other control loops 105 to compensate for any error in the dynamic offset signals. In some applications, it may be desirable to adjust the dynamic offset gains and, therefore, they are illustrated as an optional gain value within the respective dynamic offset paths.

The multiple dynamic offset signals may be used in place of traditional feed forward signals. The position offset signal, $\theta_{off}$, 57 is provided as an input to the second summing junction 106 after the position loop controller 104. The velocity offset signal, $\omega_{off}$, 59 is provided as in input to the third summing junction 120 after the velocity loop controller 108. Finally, the torque offset signal, $T_{off}$, is provided as an input to the fourth summing junction 126 subsequent to the feedback control paths. This allows the feedback control loops 105 to still be tuned independently of the torque offset provided from the external processing device With reference again to FIG. 1, the output of the control module 55 is provided as an input to the current regulator 61 and, in turn, to the gate driver module 60. The gate driver module 60 converts the input to a desired output voltage having a variable amplitude and frequency. Having determined the output voltage required to produce the desired input, the gate driver module 60 generates the gating signals 31 used by pulse width modulation (PWM) or by other modulation techniques to control the switching elements in the inverter section 30 to produce the desired output voltage. The gating signals 31 subsequently enable/disable the switching elements 32 to provide the desired output voltage to the motor 40, which, in turn, results in the desired operation of the mechanical load 42 coupled to the motor 40.

In operation, the dynamic offset value 49 provides improved feed forward control of the motor 40 by the motor drive 10. The torque offset value, $T_{off}$, provided as the dynamic offset value 49 provides predictive torque requirements of the controlled system as determined by an external processing device. The predictive torque requirement allows the motor drive 10 to output a voltage that more closely corresponds to the voltage required to follow the desired motion profile for the motor. This results in reduced following error between the commanded position and the actual position of the motor 40.

According to one aspect of the invention, the external processing device determines the torque offset value, $T_{off}$, according to the rigid-body dynamic model of the controlled system. The additional control loops 105 then compensate for elastic dynamics present in the controlled system and not included in the rigid-body model. As discussed above, both the torque offset value 49 and the motion command 47 may be provided to the motor drive 10 at a first update rate. The first update rate accommodates network communication rates between the external processing device and the motor drive 10. The slower first update rate additionally reduces processing burden on the external processing device generating the torque offset value, $T_{off}$, and the position reference command, $\theta^*$.

As discussed above, the motor drive 10 includes a first interpolator 70, receiving the reference command signal 47, and a second interpolator 74, receiving the torque offset value, $T_{off}$, as a dynamic offset value 49. The first and second interpolators 70, 74 are configured to interpolate the input values, sampled at the first update rate, and to generate multiple values for both the torque offset value, $T_{off}$, and the position reference command, 9*, between those values sampled at the first update rate. The resulting values correspond to a single value for each of the torque offset value, $T_{off}$, and the position reference command, $\theta^*$, at each sampling interval for the second update rate. For the embodiment illustrated in FIG. 5, the third and fourth interpolators 80, 84 similarly execute on the position offset signal, $\theta_{off}$, 57 and the velocity offset signal, $\omega_{off}$. Interpolation, as used herein, indicates generation of additional values of a sampled signal such that the sampled signal appears to be sampled at a rate faster than the original sampling rate. Interpolation does not strictly indicate determining a value between two existing values. Rather, it is contemplated that a pattern of sampled values may be extended in time beyond the most recent sampled value for additional intervals prior to the next sampled value. For instance, a first sampled value and a second sampled value may be used to determine a rate of change between the two sampled values. If the second update rate executes ten times faster than the first update rate, the motor drive 10 may be configured to generate nine additional values of the sampled signal where a rate of change of the additional values remains the same for the nine additional values and the interval between each of the additional values is at the second update rate. The nine additional values plus the sampled value generate ten values of the sampled signal that are used between sampling intervals at the first sampling update rate. When the third sampled value of a signal is taken at the next interval of the first sampling update rate, the second and third sampled values may be utilized to determine a new rate of change of the sampled signals. The process continues to repeat itself generating additional values of the sampled signal for each successive sampling interval.

As discussed above, the output of each of interpolators 70, 74, 80, and 84 are provided as inputs to notch filters 72, 76, 82, and 86, respectively. The notch filters may remove a component of the interpolated reference command signal or of the interpolated torque offset value, where the component corresponds to a undesired frequency of operation in the controlled system which may generate vibration or unstable operation of the motor 40. Although an initial value of the notch frequency, $F_N$, may be set for each of the notch filters, 72, 76, 82, and 86 it may be necessary to adjust the value during operation to maintain the desired performance. Variable conditions including, but not limited to, temperature fluctuation, humidity variation, and component wear may cause the dynamics of the controlled system to change. In addition, resonant operating points, not observed during initial tuning of the control module 55, may manifest during operation of the controlled system. The controller 50, therefore, may adjust the notch frequency, $F_N$, for each of the notch filters, 72, 76, 82, and 86 to track changes in existing resonances or new resonances developing in the controlled system during operation of the motor 40.

The frequency, $F_N$, of the notch filter may initially be set during a commissioning process for the motor drive 10. A known reference signal may be applied to the system to determine a resonant frequency of the controlled system. The known reference signal may be, for example, a position command signal ($\theta^*$) varying at a known rate, a velocity command signal ($\omega^*$), or a torque command signal ($T^*$). While the known command signal is applied to the system, a signal corresponding to the response of the controlled system is measured. The signal preferably corresponds to either an internally computed signal or a measured feedback signal related to the torque and/or current output to the motor 40 when the known command signal is applied. According to one embodiment of the invention, a feedback signal from one of the current sensors 54 at the output from the inverter section 30 is used for the response data. According to another embodiment of the invention, a feedback signal from the position sensor 44 is used for the response data. A series of values of either the current or position feedback signals while the motor 40 is operating are sampled and stored in the memory device. A frequency response of the system may be determined from the series of stored values and an initial notch frequency, $F_N$, is set to a resonant frequency as identified in the frequency response. According to another aspect of the invention, the resonant frequency may be very slow with respect to the reference signal. Rather than utilizing feedback signals within the drive, a technician performing the commissioning process may run a timer and count a number of oscillations in the controlled system while the timer is running. A resonant frequency may be determined as a function of the duration of the timer and the number of oscillations counted. The initial notch frequency, $F_N$, may be set to the resonant frequency identified by the technician.

The frequency response is a measurement of a signal providing a magnitude and phase of the signal as a function of frequency. In order to determine the frequency response of a signal, a continuous function defining the signal may be determined and a Fourier transform of the continuous function is performed. The Fourier transform expresses the function as a function of frequencies over an infinite frequency interval. However, determining the Fourier transform of a continuous function is computationally intensive. In order to reduce the computation requirements for the frequency analysis of the signal to a suitable level for real-time control, the signal is sampled over a defined sample interval at a sampling frequency and the sampled data is stored in memory. A Discrete Fourier Transform (DFT) is performed on the sampled data to express the stored signal as a discrete set of complex vectors having magnitude and phase information of the sampled signal over a finite frequency interval.

According to one embodiment of the invention, the controller 50 monitors two signals within the controlled system. A first monitored signal corresponds to a command signal and a second monitored signal corresponds to a response signal. With reference to FIG. 6, the monitored command signal may be the command signal 47 or the dynamic offset value 49. The monitored response signal may be taken after the third summing junction 120 and before the output to the plant 130. The controller 50 continually stores values of the monitored signals in the memory device 45 on a periodic basis while the motor drive 10 is operating. Preferably, a buffer is defined in the memory device 45 having a fixed length and data is stored on a first-in-first-out (FIFO) basis in the buffer. The controller 50 obtains the frequency response of the stored data for both the monitored command signal and the monitored response signal while also controlling operation of the motor 40. A DFT is evaluated to determine the frequency response of the stored signals. The controller 50 generates a command spectrum and response spectrum, each of which identifies a frequency, or frequencies, having the greatest magnitude information based on the monitored command signal and the monitored response signal, respectively. In the frequency response, the frequency, or frequencies, with the greatest magnitude information are those most excited by the control system and the response at those frequencies may need to be reduced.

The controller 50 then evaluates the command spectrum and the response spectrum to determine how best to respond to the identified frequency. If, for example, the controller 50 is being commanded to perform a repeated operation, the frequency in the response spectrum having the greatest magnitude may be a desired operation and, therefore, correspond to a frequency in the command spectrum. Tuning the controller 50 to reduce the magnitude of this frequency in the response spectrum would be detuning a desirable response. If, however, the frequency identified in the response spectrum with the greatest magnitude information is not in the command spectrum, the controller 50 may adjust the notch frequency, $F_N$, to correspond to the resonant frequency in order to reduce or mitigate the response.

Optionally, the controller 50 may be configured to determine frequency responses for the position reference signal 47 and/or each of the dynamic offset values 49, 57, 59. Separate notch frequencies may be maintained for each notch filter 72, 76, 82, 86. Optionally, a separate notch frequency may be maintained for the position reference signal 47 while the notch frequency for each of the dynamic offset values 49, 57, 59 are changed in tandem. The notch frequency for each of the dynamic offset values 49, 57, 59 may utilize the frequency component from each frequency response having the greatest amplitude as a frequency requiring filtering. The notch frequency, $F_N$, for the second, third, and fourth notch filters 76, 82, 86 are kept the same, such that the same frequency components are filtered from each input signal. The notch frequency, $F_N$, for these filters are set to the undesired frequency component from each of the frequency responses having the greatest magnitude.

Figure 11:
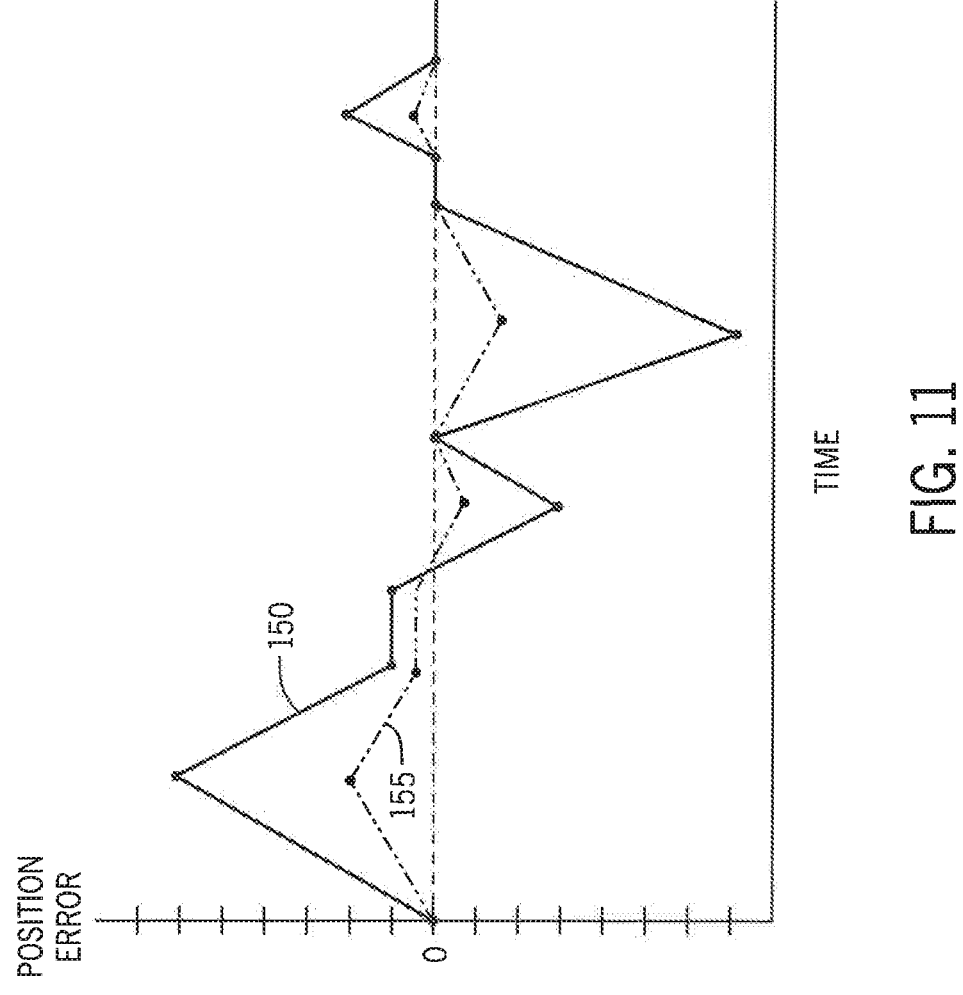
FIG. 11 is a graphical representation of following error with respect to time for a motor drive with and without the dynamic offset value.

Turning next to FIG. 11, a plot of position error with respect to time illustrates the improvement obtained in controlling the motor 40 via a motor drive 10 incorporating at least one of the dynamic offset inputs. A first plot 150 illustrates following error present in the motor control loops 105 when no dynamic offset signal is provided to the motor drive 10. A second plot 155 illustrates following error present in the motor control loops 105 when an external processing device is providing a torque offset value, $T_{off}$, as the dynamic offset value 49. The addition of the torque offset value, $T_{off}$, as the dynamic offset value 49 reduces following error to about one-third of the following error present with no dynamic offset signal 49.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A motor drive for controlling operation of a motor, comprising:

a DC bus having a positive rail and a negative rail, wherein the DC bus is operable to receive a DC voltage between the positive rail and the negative rail;

an inverter section having a plurality of switching elements, wherein each switching element is controlled by a gating signal and wherein the inverter section is operable to receive the DC voltage from the DC bus and provide an AC voltage at an output of the motor drive;

an input interface configured to receive a reference signal and an offset signal from an external source, wherein the reference signal and the offset signal are sampled from the input interface at a first update rate, wherein the first update rate executes at an interval having a range between two hundred microseconds and ninety-nine milliseconds;

a feedback interface configured to receive a position feedback signal from a position sensor operatively connected to the motor; and a controller operable to:

sample the feedback interface to obtain values of the position feedback signal at a second update rate, the second update rate faster than the first update rate, interpolate the reference signal, sampled at the first update rate, to generate a plurality of values of the reference signal at the second update rate, interpolate the offset signal, sampled at the first update rate, to generate a plurality of values of the offset signal at the second update rate, and generate either a voltage reference or a current reference as a function of the position feedback signal, the reference signal, and the offset signal at the second update rate, wherein the voltage reference or the current reference corresponds to desired operation of the motor connected to the motor drive.

2. The motor drive of claim 1, wherein the controller is further operable to:

pass the plurality of values of the reference signal generated at the second update rate through a first notch filter, and pass the plurality of values of the offset signal generated at the second update rate through a second notch filter.

3. The motor drive of claim 2, wherein the controller is further operable to:

determine a frequency spectrum of a response signal in the motor drive, select a notch frequency from a plurality of frequencies present in the frequency spectrum, set the first notch filter to execute at the notch frequency on the plurality of values of the reference signal, and set the second notch filter to execute at the notch frequency on the plurality of values of the offset signal.

4. The motor drive of claim 1 further comprising an observer configured to receive the position feedback signal as an input and to generate an estimated control value, wherein:

the estimated control value is selected from an estimated position, an estimated velocity, an estimated acceleration, or an estimated torque, the observer transmits the estimated control value to the controller, and the controller is further operable to generate either the voltage reference or the current reference as a function of the values of the position feedback signal, the values of the reference signal, the values of the offset signal, and the estimated control value at the second update rate.

5. The motor drive of claim 1, wherein:

the reference signal corresponds to either a desired position or a desired velocity of the motor, and the offset signal dynamically varies as a function of the desired position of the motor.

6. The motor drive of claim 5, wherein the offset signal is a position offset value, a velocity offset value, a torque offset value, or a combination thereof.

7. The motor drive of claim 6 further comprising an observer configured to receive the position feedback signal as an input and to generate an estimated control value, wherein:

the estimated control value is selected from an estimated position, an estimated velocity, an estimated acceleration, or an estimated torque, the observer transmits the estimated control value to the controller, and the controller is further operable to generate either the voltage reference or the current reference as a function of the values of the position feedback signal, the desired position or the desired velocity of the motor, the offset signal, and the estimated control value at the second update rate.

8. A method for controlling operation of a motor, comprising the steps of:

obtaining a reference signal and an offset signal from an input interface of a motor drive at a first update rate, wherein the motor drive is operatively connected to control operation of the motor and wherein the first update rate executes at an interval having a range between two hundred microseconds and ninety-nine milliseconds;

sampling a position feedback signal at a second update rate, wherein the position feedback signal corresponds to an angular position of the motor and wherein the second update rate is faster than the first update rate;

interpolating the reference signal to generate a plurality of values of the reference signal at the second update rate;

interpolating the offset signal to generate a plurality of values of the offset signal at the second update rate; and generating either a voltage reference or a current reference as a function of the position feedback signal, the reference signal, and the offset signal at the second update rate, wherein the voltage reference or the current reference corresponds to desired operation of the motor connected to the motor drive.

9. The method of claim 8, further comprising the steps of:

filtering the plurality of values of the reference signal generated at the second update rate through a first notch filter; and filtering the plurality of values of the offset signal generated at the second update rate through a second notch filter.

10. The method of claim 9, further comprising the steps of:

determining a frequency spectrum of a response signal;

selecting a notch frequency from a plurality of frequencies present in the frequency spectrum;

setting the first notch filter to execute at the notch frequency; and setting the second notch filter to execute at the notch frequency.

11. The method of claim 8, further comprising the steps of:
receiving the position feedback signal at an observer in the motor drive;
generating an estimated control value with the observer as a function of the position feedback signal, wherein the estimated control value is selected from an estimated position, an estimated velocity, an estimated acceleration, or an estimated torque; and
generating either the voltage reference or the current reference as a function of the position feedback signal, the reference signal, the offset signal, and the estimated control value at the second update rate.

12. The method of claim 8, wherein:
the reference signal corresponds to either a desired position or a desired velocity of the motor, and
the offset signal dynamically varies as a function of the desired position of the motor.

13. The method of claim 12, wherein the offset signal is a position offset value, a velocity offset value, a torque offset value, or a combination thereof.

14. The method of claim 13, further comprising the steps of:
receiving the position feedback signal at an observer in the motor drive;
generating an estimated control value with the observer as a function of the position feedback signal, wherein the estimated control value is selected from an estimated position, an estimated velocity, an estimated acceleration, or an estimated torque; and
generating either the voltage reference or the current reference as a function of the position feedback signal, the desired position or the desired velocity of the motor, the offset signal, and the estimated control value at the second update rate.

15. A controller for a motor, comprising:
an input interface configured to receive a reference signal and an offset signal from an external source;
a feedback interface configured to receive a position feedback signal corresponding to an angular position of the motor; and
a processor operative to:
sample the reference signal and the offset signal at a first update rate, wherein the first update rate executes at an interval having a range between two hundred microseconds and ninety-nine milliseconds,
sample the position feedback signal at a second update rate, the second update rate faster than the first update rate,
interpolate the reference signal, sampled at the first update rate, to generate a plurality of values of the reference signal at the second update rate,
interpolate the offset signal, sampled at the first update rate, to generate a plurality of values of the offset signal at the second update rate, and
generate either a voltage reference or a current reference as a function of the position feedback signal, the reference signal, and the offset signal at the second update rate, wherein the voltage reference or the current reference corresponds to desired operation of the motor.

16. The controller of claim 15, wherein:
the plurality of values of the reference signal generated at the second update rate are passed through a first notch filter;
the plurality of values of the offset signal generated at the second update rate are passed through a second notch filter; and
the processor is further operative to:
determine a frequency spectrum of a response signal,
select a notch frequency from a plurality of frequencies present in the frequency spectrum,
set the first notch filter to execute at the notch frequency on the plurality of values of the reference signal, and
set the second notch filter to execute at the notch frequency on the plurality of values of the offset signal.

17. The controller of claim 15, wherein:
the processor is further operative to generate an estimated control value as a function of the position feedback signal with an observer,
the estimated control value is selected from an estimated position, an estimated velocity, an estimated acceleration, or an estimated torque, and
the processor is further operative to generate either the voltage reference or the current reference as a function of the position feedback signal, the reference signal, the offset signal, and the estimated control value at the second update rate.

18. The controller of claim 15, wherein:
the reference signal corresponds to either a desired position or a desired velocity of the motor, and
the offset signal dynamically varies as a function of the desired position of the motor.

19. The controller of claim 18, wherein the offset signal is a position offset value, a velocity offset value, a torque offset value, or a combination thereof.

20. The controller of claim 19, wherein the processor is further operative to:
generate an estimated control value as a function of the position feedback signal with an observer, and
generate either the voltage reference or the current reference as a function of the position feedback signal, the desired position or the desired velocity of the motor, the torque offset signal, and the estimated control value at the second update rate.

* * * * *